Sept. 9, 1952     D. M. POOLE     2,609,656
GAS TURBINE POWER PLANT HAVING FUEL CUT-OFF VALVE
ACTUATED BY AN OVERSPEED GOVERNOR
Original Filed April 15, 1944     3 Sheets-Sheet 1

Patented Sept. 9, 1952

2,609,656

UNITED STATES PATENT OFFICE 2,609,656

GAS TURBINE POWER PLANT HAVING FUEL CUT-OFF VALVE ACTUATED BY AN OVER-SPEED GOVERNOR

David M. Poole, Oak Ridge, Tenn., assignor to United Aircraft Corporation, East Hartford, Conn., a corporation of Delaware Original application April 15, 1944, Serial No. 531,310. Divided and this application June 17, 1948, Serial No. 33,486

1 Claim. (Cl. 60—13)

This invention relates to a control system for an aircraft power plant which includes gas generators for supplying gas under pressure to a turbine which drives a propeller. A burner may be used between the generators and the turbine for adding heat to the gas. This is a division of Serial No. 531,310, filed April 15, 1944.

A feature of the invention is an arrangement for cutting off the fuel supply to the burner in the event of turbine overspeeding. Another feature is the complete cutting off of all fuel to the power plant when the turbine exceeds a predetermined speed.

Other objects and advantages will be apparent from the specification and claim, and from the accompanying drawings which illustrate an embodiment of the invention.

Fig. 4 is a sectional view through one of the fuel injection devices.

Fig. 5 is an end view of an overspeed governor.

Figure 1:
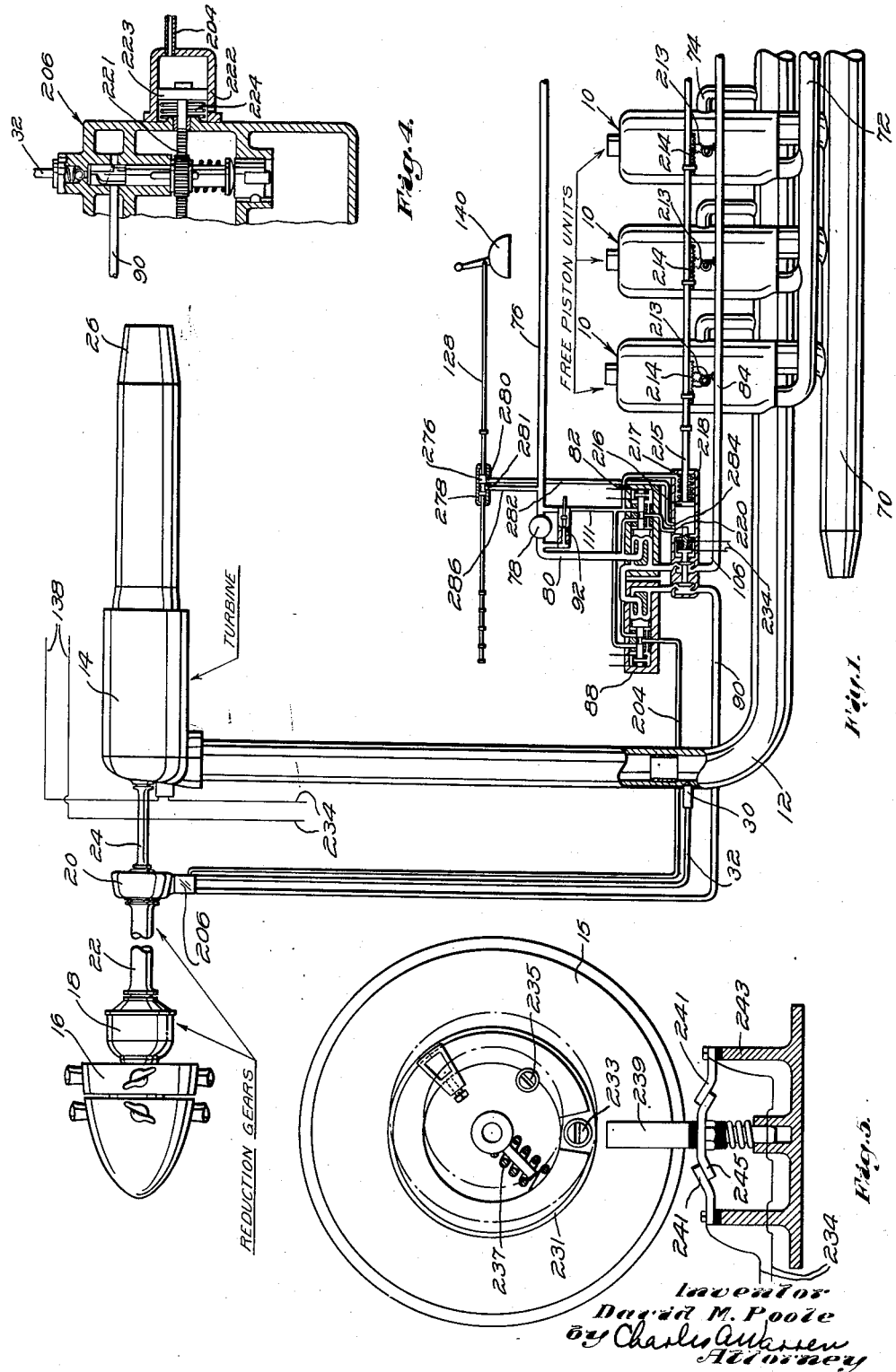
Fig. 1 is a diagrammatic view of the power plant showing the fuel supply system.

The generators 10 supply hot gas under pressure through a duct 12 to the intake of the turbine 14. The latter is connected to a propeller system 16 through gear reduction units 18 and 20 and shafts 22 and 24. The turbine exhaust discharges as a jet through a restricted nozzle 26 which may be directed rearwardly of the aircraft to produce an additional propulsive thrust.

The gas is heated between the generators and the turbine by discharging fuel into duct 12 through a fuel nozzle 30 supplied by a fuel line 32. Fuel is admitted at a point spaced far enough from the turbine to assure complete burning of the fuel before the power gas has reached the turbine inlet.

Figure 2:
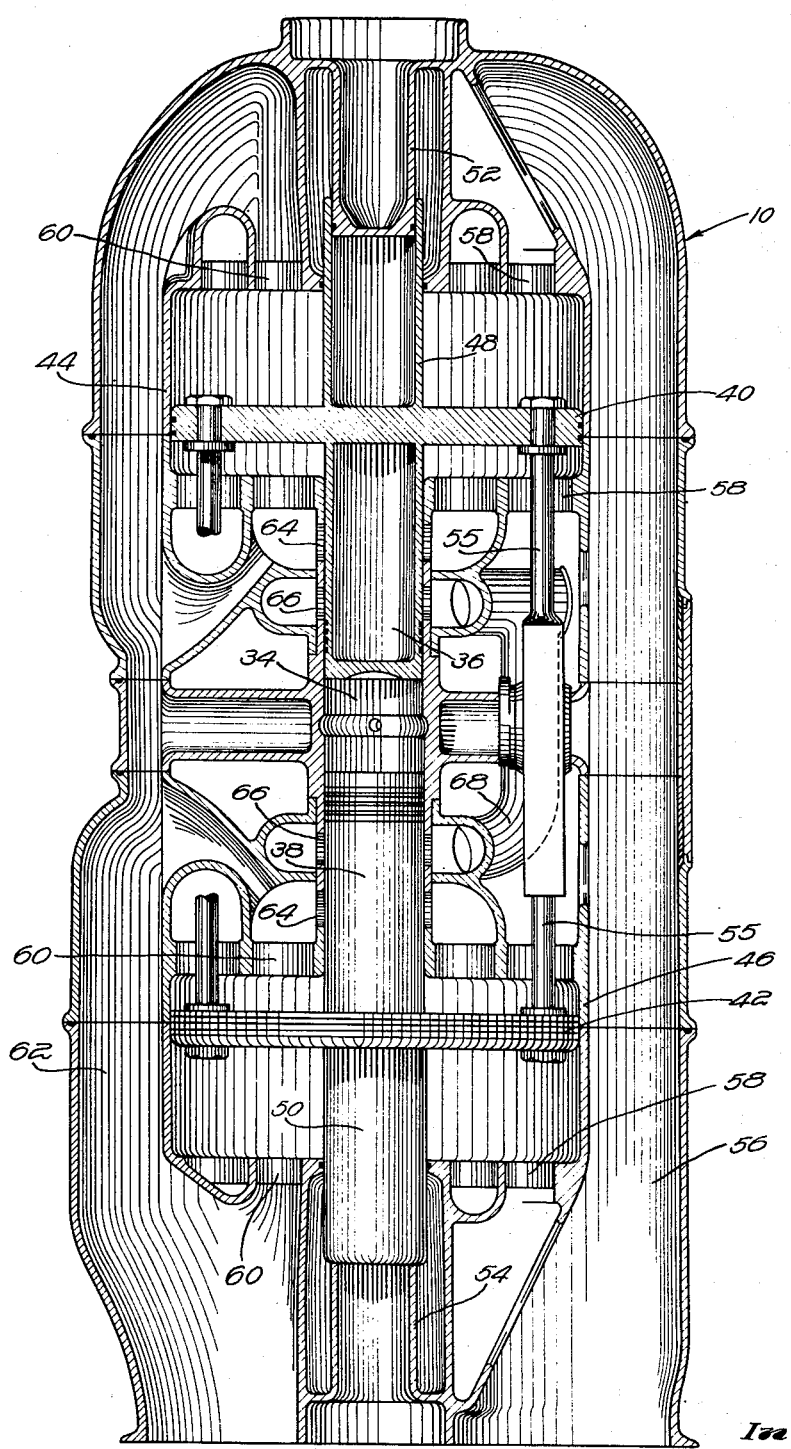
Fig. 2 is a sectional view on a larger scale of one of the generators.

As shown in Fig. 2, each generator, which supplies hot compressed gas, maybe in the form of a free-piston engine-and-compressor unit comprising an engine cylinder 34 having reciprocating pistons 36 and 38 to which compressor pistons 40 and 42 in cylinders 44 and 46 are integrally connected. Sleeves 48 and 50 attached to the compressor pistons complete the reciprocating piston assemblies. The sleeves, in combination with pistons 52 and 54 over which they reciprocate, form air spring cylinders.

The piston assemblies are moved apart by the burning of the fuel injected into the engine cylinder between the engine pistons. Air compressed in the air spring cylinders on the power stroke returns the piston assemblies. The assemblies are maintained at equal distances from the center of the engine cylinder by a linkage of which rods 55 may form a part.

Intake manifold 56 conducts air to sets of intake valves 58 through which air alternately enters opposite ends of the compressor cylinders. The compressed air leaves the cylinders through sets of discharge valves 60 also at opposite ends of the compressor cylinders and passes through scavenge manifold 62 and through ports 64 which are uncovered by pistons 36 and 38 at the end of the power stroke. Air entering these ports is blown through the engine cylinder and discharges through exhaust ports 66 into exhaust manifolds 68, Fig. 2.

The intake manifolds of the several units are connected to an intake duct 70. The scavenge manifolds are interconnected by a pipe 72. The exhaust gases flow from the exhaust manifolds through pipes 74 into duct 12.

Figure 3:
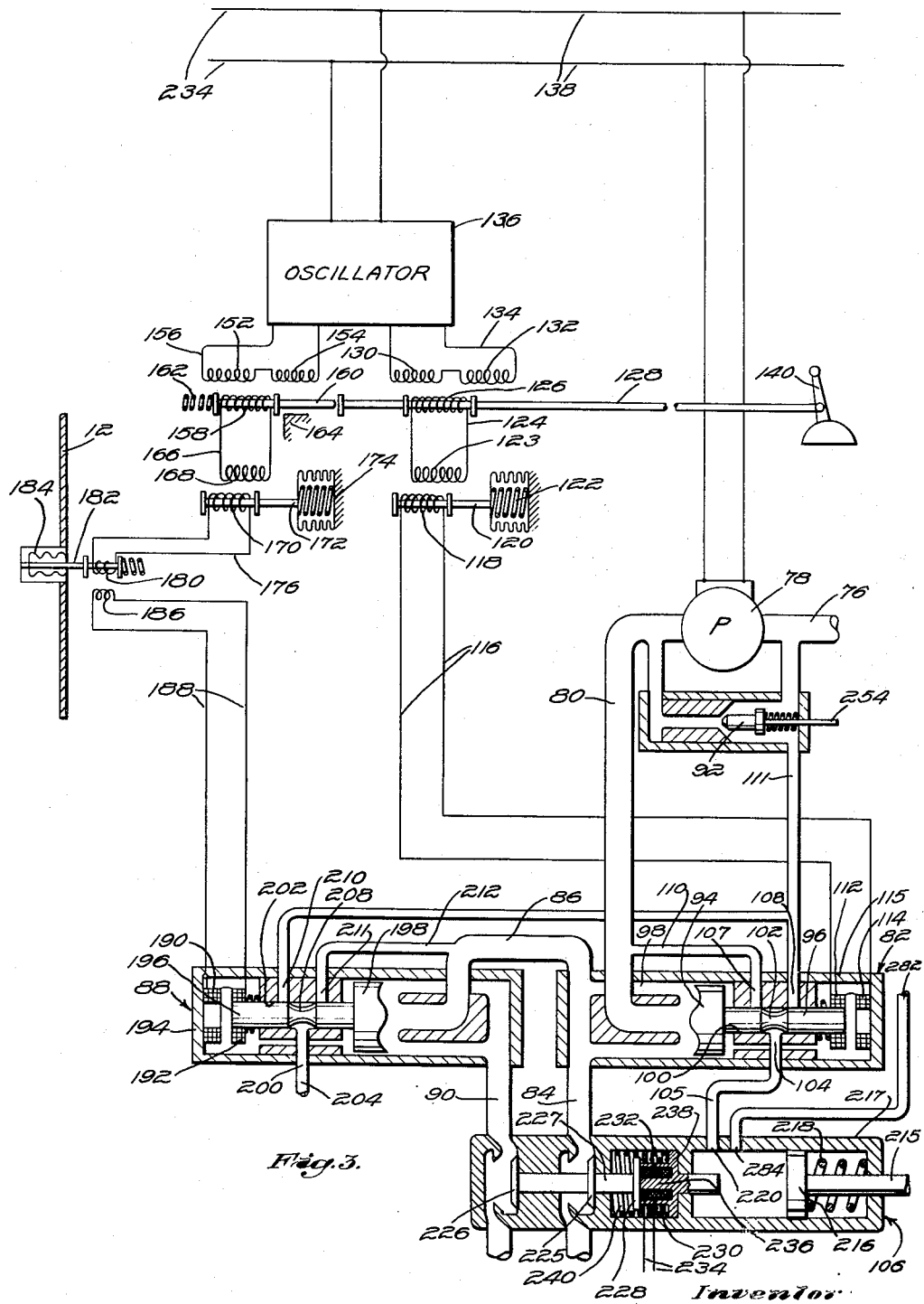
Fig. 3 is a diagram of the fuel control system and the electrical system.

Referring to Fig. 3, fuel for the generators and the burner is delivered from a supply, not shown, through a pipe 76 to a pump 78. From this pump, fuel flows through a conduit 80 to a control device 82 by which the total fuel flow to the power plant is controlled. From control device 82 fuel flows through a conduit 84 to the generators 10. A part of the fuel from device 82 may discharge through a conduit 86 to a control device 88 by which the burner fuel is controlled. From device 88 a conduit 90 directs fuel to line 32, Fig. 1, and thence to the burner nozzle.

Pressure in the supply conduit 80 is adjusted by relief valve 92 in a bypass for a pump. Fuel entering device 82 discharges against the head 94 of a plunger 96, and is directed by this head through an annular path 98 to conduits 84 and 86. Plunger 96 slides in a bore 100 and has a groove 102 in line with a port 104 connected by a conduit 105 to a device 106 forming a part of the control device for the generator fuel. Groove 102 alternately connects port 104 with a supply port 107 or a vent port 108. Port 107 is connected by a conduit 110 to a supply of control fluid which may be the conduit 80 in which event a part of the fuel is used as the control fluid. Vent port 108 may be connected by a duct 111 to conduit 76.

The end of plunger 96 has a solenoid 112 in spaced relation to a stationary coil 114 in the end of the casing 115 for the control device 82. These coils 112 and 114 have bucking fields and the plunger 96 which adjusts the supply of control fluid to device 106 is moved by a change in the repulsive effect between these coils. Coils 112 and 114 are connected in series and in opposition in a circuit 116 which includes an induction coil 118 mounted on a rod 120 projecting from a pressure sensitive bellows 122.

In a fixed position in parallel relation to coil 118 is a coil 123 in a circuit 124 which includes an induction coil 126 on a rod 128. Coil 126 is moved relative to opposed coils 130 and 132 having bucking fields in a circuit 134 which includes an oscillator 136 receiving power from supply lines 138.

Rod 128 is connected to a control lever 140 by which the pilot may adjust the fuel supply to the power plant. Movement of lever 140 places coil 126 more or less in line with coil 130 and out of a position to be affected by coil 132, thus varying the induced voltage in coil 126. The repulsive effect between coils 112 and 114 increases as coil 126 is moved to the left, causing plunger 96 to move to the left and connecting supply port 107 to port 104, thereby admitting fluid under pressure to the device 106, and thus increasing the quantity of fuel delivered to the generators. As the atmospheric pressure decreases, coil 18 is moved out of alignment with coil 123 decreasing the induced voltage in coil 118 and thus decreasing the repulsive affect between coils 112 and 114. Plunger 96 then moves to the right to connect port 104 and vent port 108 for reducing the quantity of fuel delivered to the generators.

The plunger 96 in addition to being moved by the repulsive affect between coils 112 and 114 is is also moved by the thrust exerted on the head 94 by the flow of fuel from conduit 80 against the head. Thus, if the plunger 96 is moved to the left by the action of the coils indicating a requirement for more fuel, the plunger is restored to the neutral position shown by the increased thrust on the head resulting from the increase of fuel. The device 106 by which an increase of fuel is obtained will be described in detail later.

The burner fuel flow is similarly controlled. Coils 152 and 154, with bucking fields, are in series in a circuit 156 which includes the oscillator 136. A coil 158 is movable with respect to coils 152 and 154 being carried on a rod 160, the end of which is in a position to be engaged and moved by rod 128 during its movement to the left. A spring 162 moves rod 160 toward the right against a stop 164 so located that when rod 128 moves toward the right, rod 160 will be stopped when coil 158 is midway between the opposed coils 152 and 154. In this position no voltage is induced in the circuit 166 which includes coil 158 and a stationary coil 168.

Coil 168 is adjacent to a movable coil 170 on a rod 172 extending from a pressure sensitive bellows 174 which moves coil 170 more or less out of direct opposition to coil 168 in response to changes in atmospheric pressure. Coil 170 is in a circuit 176 which includes a movable coil 180 on a rod 182 extending from a temperature sensitive element 184 mounted in duct 12 adjacent to the turbine intake. As the temperature in duct 12 increases by burning fuel in the duct, coil 180 is moved with respect to a fixed coil 186, thereby decreasing the induced voltage in a circuit 188 which includes the repulsion coils 190 and 192. Coil 190 is mounted in the end of a casing 194 for the device 88. Coil 192 is mounted on a plunger 196 projecting from the head 198 against which the burner fuel is discharged from duct 86.

A port 200 entering the bore 202 in which plunger 196 slides is connected by conduit 204 to a device 206 actuated by device 88 and adapted for increasing the fuel flow by pressure in conduit 204. A groove 208 in plunger 196 alternately connects this port to a vent port 210 or to a supply port 211, the latter being connected by a conduit 212 to conduit 86. As the repulsive effect between coils 190 and 192 is increased, as by motion of coil 158 to the left, plunger 196 is moved to the right to increase the supply of control fluid through device 88 to the device 206. The neutral position of the plunger in which both ports 210 and 211 are covered is restored by the increasing thrust on head 198 resulting from the increased flow of fuel against the head and into the conduit 90.

The above described controls are intended to provide a total fuel flow proportional to the extent of movement of the control lever 140 and at a predetermined lever setting to start the burner in operation. During the part of the power plant operation when the burner is on, the burner fuel is subtracted from the total fuel flow, the latter being under the control of device 82 and the burner fuel being controlled by device 88. The atmospheric bellows 122 and 174 reduce the supply of fuel to both generators and burner as the atmospheric pressure decreases. Furthermore, the temperature responsive device 184 reduces the burner fuel as the maximum desired turbine inlet temperature is approached. This fuel control is fully described in the copending application of Kalitinsky and Meltzler, Serial No. 531,304, filed April 15, 1944, now Patent No. 2,447,124, and will not be described in greater detail.

The fuel supply to the generators may be by well known injection devices 213, similar, for example, to the burner pump 206, hereinafter described in more detail, all connected to conduit 84, and each having a rack 214, Fig. 1, by means of which the quantity of fuel may be adjusted. These racks may all be connected to a rod 215 for simultaneous movement. A piston 216 on the end of rod 215 moves in a casing 217 forming a part of device 106 and is urged toward the left by a spring 218 in a direction to reduce the quantity of fuel supplied to the generators by the injection devices.

Conduit 105 is connected to a port 220 in casing 217, and fluid under pressure from this conduit moves the piston and rod 215 against spring 218 to increase the rack setting. Thus, when the control circuit of Fig. 3 is adjusted for greater fuel quantity by movement of lever 140, the racks 214 are all moved to the right under the action of fluid entering cylinder 217.

Fuel is supplied to the burner through the device 206 which may be a well-known form of injection pump, as, for example, similar to the device 213. As shown in Fig. 4, the quantity of fuel delivered by the pump is controlled by a rack 221. The rack setting is increased by the admission of fluid under pressure from duct 204 into a cylinder 222 having a piston 223 which may be mounted on the rack. A spring 224 opposes the fluid pressure delivered from duct 204. The rack setting is decreased by venting fluid through this duct. Fluid is delivered to the device 206 through conduit 90 and reaches the nozzle 30 through line 32. The arrangement is such that the rack may be set to zero for that part of the power plant operation when the burner is off.

As a safety feature the fuel supply to both burner and generators may be automatically cut off if the turbine overspeeds. To accomplish this, both conduits 84 and 90 have valves 225 and 226 which may be located in a part of the device 106. These valves are mounted on a stem 227 having a head 228 engaging a spring 230 by which the valves are urged into closed position. A magnetic coil 232 normally holds the valves in the open position shown.

An overspeed governor which may be of conventional construction is mounted on the turbine shaft and normally closes a circuit 234 including coil 232. Upon overspeeding of the turbine, the overspeed governor breaks the circuit, and the valves are closed by the spring 230.

As shown in Fig. 5, the governor may include a ring 231 supported on the end of the turbine shaft 15 by a screw 233 and held against a stop 235 by a spring 237. When the centrifugal force acting on the ring, which is eccentric to the shaft axis, overcomes the load on the spring and moves the ring into the dot-dash position shown, the ring engages the plunger 239 to open the circuit 234 including the contacts 241 on the base 243, and the connector 245 on the plunger.

Coil 232 is mounted on a plunger 236 normally held in the position shown against a flange 238 by a spring 240. Plunger 236 is in a position to engage piston 216 when the latter approaches the left-hand end of its movement, so that upon a failure of control fluid in cylinder 217 or upon shut-down of the power plant, piston 216 will engage the plunger, and, by the action of spring 218 which is heavier then spring 240, will close valves 225 and 226.

To maintain the desired rack setting during starting thereby avoiding the injection of excessive quantities of fuel, a plunger 276, Fig. 1, on rod 128 slides in a casing 278 and is adapted when lever 140 is in starting position to connect a port 280 to a vent port 281. Port 280 is connected by a duct 282 to a port 284 in cylinder 217 spaced from the inlet port 220 the distance that the piston 216 should move for placing the racks of the injection devices in starting position. Port 281 may be connected by a conduit 286 to the supply conduit 76.

It is to be understood that the invention is not limited to the specific embodiment herein illustrated and described, but may be used in other ways without departure from its spirit as defined by the following claim.

I claim:

A power plant including a turbine, a propeller driven by the turbine, a free-piston type of engine unit providing combustion-supporting gas for the turbine, and a combustion chamber between the engine unit and the turbine, in combination with fuel supply means for the free-piston unit and for the combustion chamber, an injection device for the unit, a fuel nozzle in the combustion chamber, a fluid connection from said supply means to said injection device and to said nozzle, means for adjusting the quantity of fuel delivered to said device from said supply, other means for adjusting the quantity of fuel delivered to said nozzle from said supply, a valve in said fluid connection independent of both of said adjusting means, electrical means associated with said valve for holding said valve in open position, a circuit including said electrical means, and an overspeed governor driven by the turbine and arranged upon overspeeding of the turbine to control the circuit to cause the valve to close.

DAVID M. POOLE.

REFERENCES CITED

The following references are of record in the file of this patent:

UNITED STATES PATENTS

| Number | Name | Date |
| --- | --- | --- |
| 1,931,096 | Warner | Oct. 17, 1933 |
| 1,934,631 | Taylor | Nov. 7, 1933 |
| 2,095,991 | Lysholm | Oct. 19, 1937 |
| 2,147,935 | Steiner | Feb. 21, 1939 |
| 2,292,288 | Pateras Pescara | Aug. 4, 1942 |
| 2,306,953 | Jung | Dec. 29, 1942 |
| 2,336,052 | Anderson et al. | Dec. 7, 1943 |
| 2,355,177 | Pateras Pescara | Aug. 8, 1944 |
| 2,376,143 | Edwards | May 15, 1945 |
| 2,411,065 | Silvester | Nov. 12, 1946 |
| 2,423,472 | Welsh | July 8, 1947 |
| 2,439,473 | Kalitinsky | Apr. 13, 1948 |
| 2,444,254 | Hewitt | June 29, 1948 |
| 2,447,124 | Kalitinsky et al. | Aug. 17, 1948 |
| 2,468,157 | Barlow | Apr. 26, 1949 |

FOREIGN PATENTS

| Number | Country | Date |
| --- | --- | --- |
| 346,108 | Great Britain | Apr. 9, 1931 |